UNITED STATES PATENT OFFICE.

GEORGE RAYMOND ANCHORS, OF LANDING, NEW JERSEY.

CHEMICAL PROCESS FOR MAKING NITROCARBOHYDRATES.

1,329,353. Specification of Letters Patent. Patented Feb. 3, 1920.

No Drawing. Original application filed March 19, 1918, Serial No. 223,314. Divided and this application filed August 6, 1918. Serial No. 248,555.

*To all whom it may concern:*

Be it known that I, GEORGE R. ANCHORS, a citizen of the United States, and a resident of the city of Landing, county of Morris, and State of New Jersey, have invented certain new and useful Improvements in Chemical Processes for Making Nitrocarbohydrates, of which the following is a specification.

My invention relates to an improved chemical process for making nitro-carbohydrates, especially adapted for stabilizing nitro-carbohydrates, such as nitro-starch, and has for its object the provision of an improved chemical process for this purpose by means of which such materials may be readily and efficiently stabilized for use, the present application being a division of my prior application filed March 19, 1918, Serial No. 223,314.

The invention consists in the method of procedure hereinafter described and claimed.

The preferred method of procedure consists in baking cereals such as wheat, rice, corn, or the like, until the same puff or swell as by the popping of corn, or by puffing or swelling cereals as is ordinarily done with rice for table use. In this way a material is provided from which the moisture has been largely driven, which is very porous to facilitate penetration of chemicals and which is impregnated with air cells or pockets. The material thus produced is then treated with a mixture of nitric and sulfuric acids and water. This mixture preferably consists of 30 per cent. nitric acid, 64 per cent. sulfuric acid and 6 per cent. of water, and is preferably maintained at a temperature of 40 degrees Fahrenheit during the treatment. This causes nitration of the starch in the form of carbohydrates contained in the cereals treated. In doing so, the baked, puffed or swelled cereals are first placed in a suitable receptacle or vat and covered by a perforated plate temporarily held against vertical displacement. The nitrating vessel is provided with a pipe leading into the bottom thereof, and the nitrating mixture is introduced into the bottom of the vessel through this pipe, slowly rising therein until the material to be treated is completely covered with the same. This method of subjecting the material to the nitrating acids has the effect of releasing and forcing upwardly any air associated with the particles of the material, thus tending to prevent local heating thereof. Owing to the extremely porous condition resulting from the baking and puffing or swelling of the material, the acids readily penetrate the same so that a uniform product is produced in a comparatively short time.

While nitrated starch is heavier and has a greater specific gravity than water, in the form treated, that is, puffed or swelled, there is a certain amount of air imprisoned in the pores of the material which renders the same buoyant, and advantage is taken of this condition to separate the nitrating material from the spent acids. To accomplish this, the perforated plate covering and holding the material submerged is removed and water poured gently down the side of the vessel so as to cover and float upon the spent acids without undue mixing thereof. Owing to the buoyancy of the material, as above explained, the same tends to float upon this water thus introduced and the flow of water is continued until the same overflows the vessel, carrying the separated nitro-starch material with it.

The separated material is then washed with water in the usual manner until its acidity, when immersed in a volume of water a hundred times greater, is less than .50% acidity when expressed in terms of sulfuric acid. The material is then boiled in such an acid bath for twelve hours. The bath is then withdrawn in any desirable manner, preferably by decanting, and a fresh bath of the same acidity supplied and the material again boiled for twelve hours, the bath being again removed by decanting. This completes the acid treatment.

To stabilize the product the same is immersed in water and soluble salt added, which, when dissolved in water, gives a mild basic reaction. The salt preferably used for this purpose is a soap, preferably a sodium soap. This, when dissolved in water, gives a mild basic reaction, and also tends to remove any fatty substances and also tends to automatically maintain the alkalinity of the solution constant. The material is then agitated in this solution, which is heated to the boiling point. As the alkali liberated is used up, more of the salt dissociates and keeps the alkalinity of the water constant. The free fatty acids formed when the soap reacts with the acid unite with some of the molecules of the soap and produce an insoluble compound which adheres to the particles of nitro-starch and accelerates their settling when agitation ceases. The material is thus treated for four hours, when the solution is decanted. Then the material is given a treatment in boiling water for four hours, followed by three other treatments in fresh boiling water for three hours each, the water being removed by decanting after each treatment. This produces a stable nitro-starch or nitro-carbohydrate which is as stable as the best nitro-cellulose.

The excessive water is then removed by a hydro-extractor. The moist starch is then dried at a temperature of 100 degrees F. when the same is ready for use and will be found to be of high grade and sufficiently stable for all practical purposes.

While I have set forth and described the preferred method of applying my invention, this is capable of variation and modification without departing from the spirit thereof. I therefore, do not wish to be limited to the precise steps set forth, or the precise proportions of ingredients, but desire to avail myself of such variations and modifications as come within the scope of the appended claims.

Having described my invention, what I claim as new and desire to secure by Letters Patent is:—

1. The method of preparing nitro-carbohydrates, which comprises first puffing and nitrating and then treating the same with the salts of fatty acids, substantially as described.

2. The method of preparing nitro-carbohydrates, which comprises first puffing and nitrating and then treating the same with soap, substantially as described.

In testimony whereof I have signed my name to this specification in the presence of two subscribing witnesses.

GEORGE RAYMOND ANCHORS.

Witnesses:
 MAUD ANCHORS,
 BERTHA ANCHORS.